United States Patent [19]
Shirley

[11] Patent Number: 5,136,785
[45] Date of Patent: Aug. 11, 1992

[54] APPARATUS FOR CONSTRUCTING MASONRY CORNERS

[76] Inventor: Coyt C. Shirley, Rte. 1, Box 187, Waynesboro, Va. 22980

[21] Appl. No.: 805,888

[22] Filed: Dec. 12, 1991

[51] Int. Cl.⁵ ............................................. G01C 15/10
[52] U.S. Cl. ...................................... 33/404; 33/392; 33/339
[58] Field of Search .................. 33/404, 407, 408, 409, 33/410, 339, 353, 392, 393, 394, 370, 371, 347

[56] References Cited

U.S. PATENT DOCUMENTS

| | | | |
|---|---|---|---|
| 807,085 | 12/1905 | Newton | 33/353 |
| 1,069,473 | 6/1913 | Skoog | 33/339 |
| 3,150,449 | 9/1964 | Johnson . | |
| 3,153,285 | 10/1964 | Senko . | |
| 4,144,649 | 3/1979 | Huston . | |
| 4,569,179 | 2/1986 | Post . | |

*Primary Examiner*—Harry N. Haroian
*Attorney, Agent, or Firm*—Finnegan, Henderson, Farabow, Garrett & Dunner

[57] ABSTRACT

A device adapted to be mounted on a wall for vertically and horizontally aligning masonry corners. The device comprises a pair of members connected at a joint, the members defining an interior angle of approximately 90 degrees and a corresponding exterior angle of approximately 270 degress. An adjustable, elongated rod is mounted at the joint to bisect, in the alternative either the interior or exterior angle. A plumb line is secured to the elongated rod a selected distance from the joint.

14 Claims, 3 Drawing Sheets

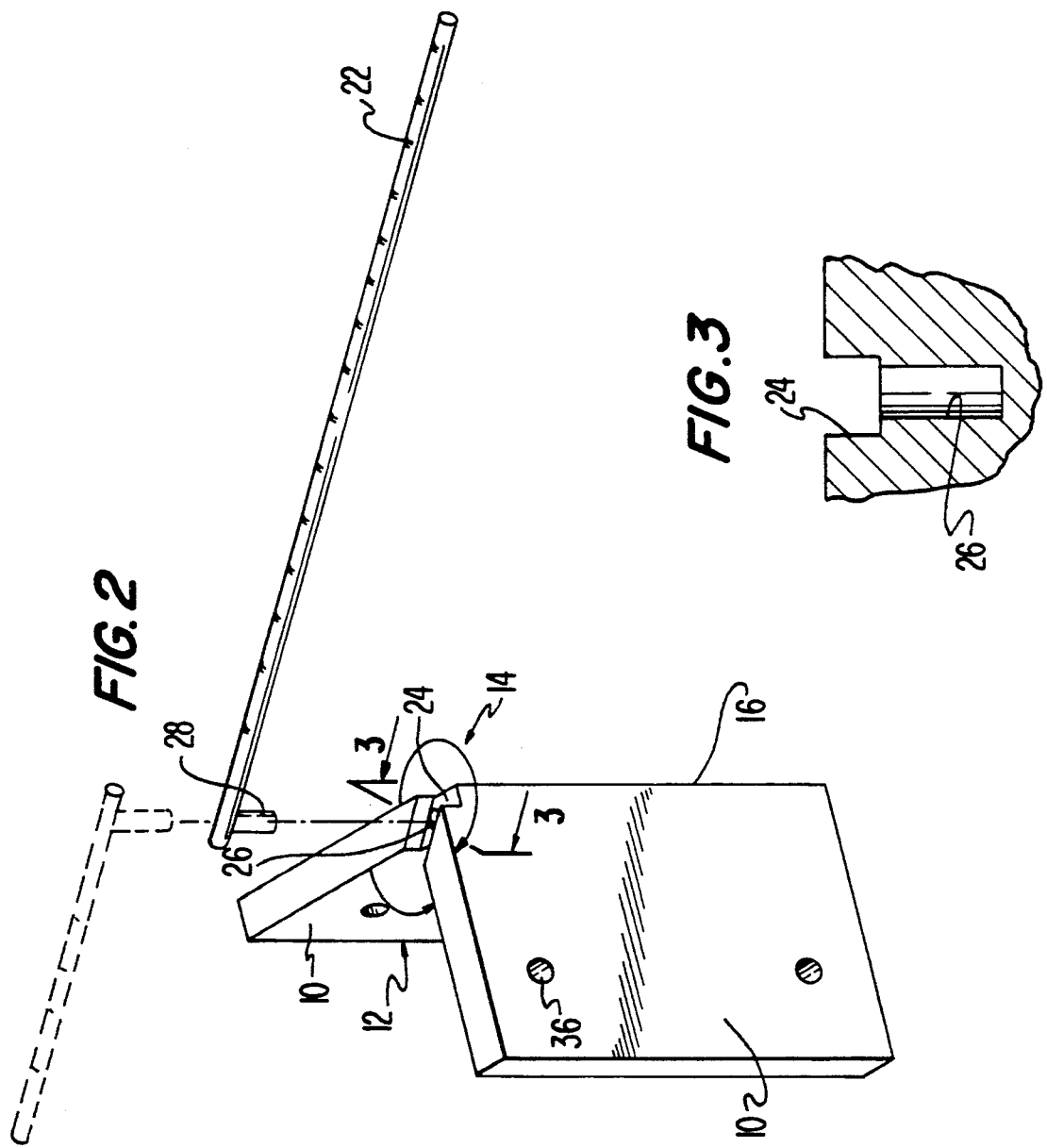

APPARATUS FOR CONSTRUCTING MASONRY CORNERS

BACKGROUND OF THE INVENTION

The present invention is directed to a device for constructing masonry corners. More particularly, the present invention relates to a device adapted to be mounted on a wall for constructing and aligning interior and exterior masonry corners with respect to the wall.

Masonry, such as brick or stone, is used in building walls and foundations for various structures, such as residential dwellings. Generally, masonry walls are built adjacent a backing wall, typically formed of plywood. Stone or brick, hereinafter referred to as masonry units, are laid in horizontal rows spaced from the backing wall to form masonry walls. To ensure the masonry walls are properly aligned with respect to the backing wall, a mason initially aligns each corner of the masonry wall with a corresponding corner on the backing wall.

Construction of the masonry corner generally involves the following procedure. A primary board, typically two by six inches in size, is secured lengthwise to a backing wall at a position spaced above the base of the wall and adjacent a corner formed by two such walls. To do so, nails must be driven in at an angle to the primary board, which generally is supported by a smaller support board, the latter being secured to the wall and positioned lengthwise beneath the larger board. The support board, among other things, ensures that the primary board is parallel with the base row of masonry units.

After aligning the boards along the corner of the backing wall, the mason eyeballs or measures the appropriate spacing from the support board for extending a plumb line. A nail is then partially driven into the support board. Thereafter, the plumb line is secured to the nail at the preferred spacing from the support board and extended to the base row of masonry units.

As one can readily appreciate, the conventional method for aligning masonry corners is cumbersome and time consuming. As a result, the conventional method is costly and, oftentimes, inaccurate.

SUMMARY OF THE INVENTION

The present invention overcomes the drawbacks of the conventional method by providing a mechanism for vertically aligning masonry corners that is simple, efficient, and accurate. Accordingly, the general object of the present invention is to provide a device adapted to be mounted on a wall for vertically and horizontally aligning masonry corners in a fast, efficient, and substantially error free manner.

Another object of the invention is to provide a single device that can be used in aligning both interior and exterior corners.

Another object of the invention is to provide a device that can be easily and quickly attached by one person to different types of backing walls, that is relatively light weight so that it is easy to transport and store, and that can be moved from corner to corner as needed with a minimum of effort.

Yet another object of the invention is to provide a device that is inexpensive to fabricate, compact in size, and preferable to the conventional method used in aligning masonry corners.

A further object of the invention is to provide a device that can be used without alteration or reconstruction for nearly any type of masonry unit.

A further object of the invention is to eliminate the need for eyeballing or measuring in determining where to position the plumb line in the conventional device.

A still further object of the invention is to provide a unitary or two piece device that is durable in construction so that it can be used many times before requiring replacement.

Additional objects and advantages of the invention will appear in the following description, and other objects and advantages will be obvious from that description, or may learned by practice of the invention. The stated objects and advantages of the invention may be realized and attained by the structure, structural cooperation, and operational features particularly pointed out in the appended claims.

To achieve the foregoing objects and in accordance with the purpose of the invention, as embodied and broadly described herein, a device adapted to be mounted on a wall for aligning masonry corners comprises a pair of members connected at a joint. The pair of members define an interior angle of approximately 90 degrees and a corresponding exterior angle of approximately 270 degrees. The device also includes an adjustable, elongated rod that is mounted at the joint and a plumb line secured to the elongated rod a selected distance from the joint.

According to the present invention, the pair of members may be integrally and rigidly connected to one another at a fixed joint. In this embodiment, the device includes an adjustable, elongated rod that is mounted within a groove along the fixed joint so that the rod bisects either the interior or exterior angle. The elongated rod, which is detachably connected to the fixed joint, includes means for retaining the rod within the groove.

Alternatively, according to the present invention, the pair of members may be pivotally connected to one another at a hinged joint. The hinged joint includes a pin that has a longitudinal axis interconnecting the members to enable the members to assume the preferred interior and exterior angles. An adjustable, elongated rod is mounted along the hinged joint and extends substantially perpendicular to a longitudinal axis so that the rod bisects either the interior or exterior angle.

BRIEF DESCRIPTION OF THE DRAWINGS

The accompanying drawings, which are incorporated in and constitute a part of the specification, illustrate presently preferred embodiments of the invention and, together with the description, serve to explain the principles of the invention.

Of the drawings:

FIG. 2 is a perspective view of the embodiment illustrated in FIG. 1.

FIG. 3 is a partial, sectional view of a fixed joint taken along line 3—3 in FIG. 2.

FIG. 5 shows an elongated rod bisecting an angle of approximately 90 degrees.

DESCRIPTION OF THE PREFERRED EMBODIMENTS

Reference will now be made in detail to the presently preferred embodiments of the invention, examples of which are illustrated in the accompanying drawings. Referring now to FIGS. 1 through 5, it can be seen that the present invention provides a simple, efficient, compact, and accurate apparatus for vertically and horizontally aligning masonry corners relative to a wall 1.

In accordance with the present invention, the device for aligning masonry corners includes a pair of substantially planar, rectangular members connected at a joint so that the members define an interior angle of approximately 90 degrees and an exterior angle of approximately 270 degrees. As embodied herein and shown principally in FIGS. 2, 4 and 5, members 10, 10a are connected at a joint defining an interior angle 12, 12a of approximately 90 degrees and a corresponding exterior angle 14, 14a of approximately 270 degrees.

Figure 1:
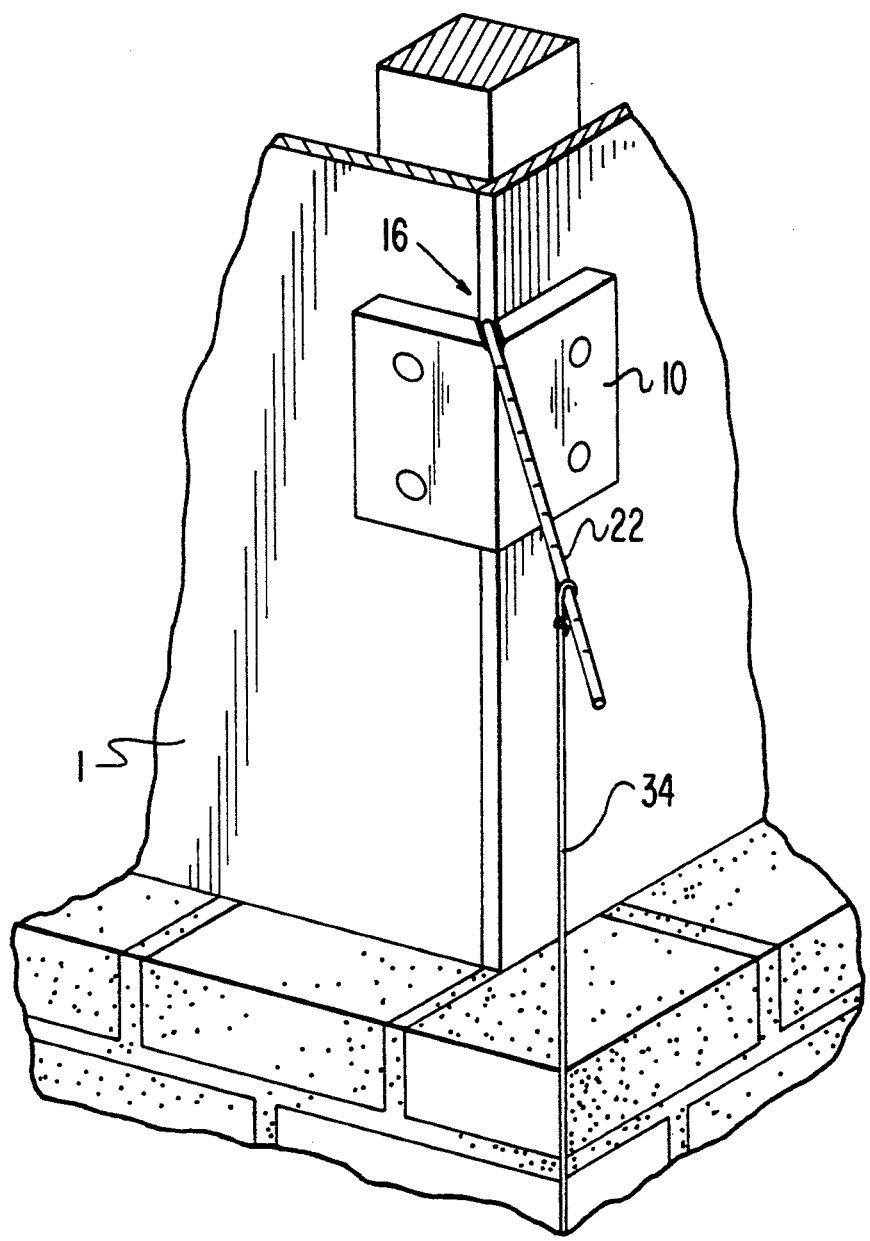
FIG. 1 is a perspective view of a presently preferred embodiment of the present invention.

In the embodiment shown in FIGS. 1 through 3, members 10 are integrally and rigidly connected to one another at a fixed joint 16 so that the members define an interior angle 12 of approximately 90 degrees and a corresponding exterior angle 14 of approximately 270 degrees. In the embodiment illustrated in FIGS. 4 and 5, members 10a are pivotally connected to one another at a hinged joint 18. Preferably, members 10a are attached to a pin 20 or a similar hinged mechanism. The hinged joint 18 of the present invention allows the members alternately to assume angular orientations of approximately 90 degrees and approximately 270 degrees, as indicated by reference numerals 12a and 14a, respectively.

Figure 4:
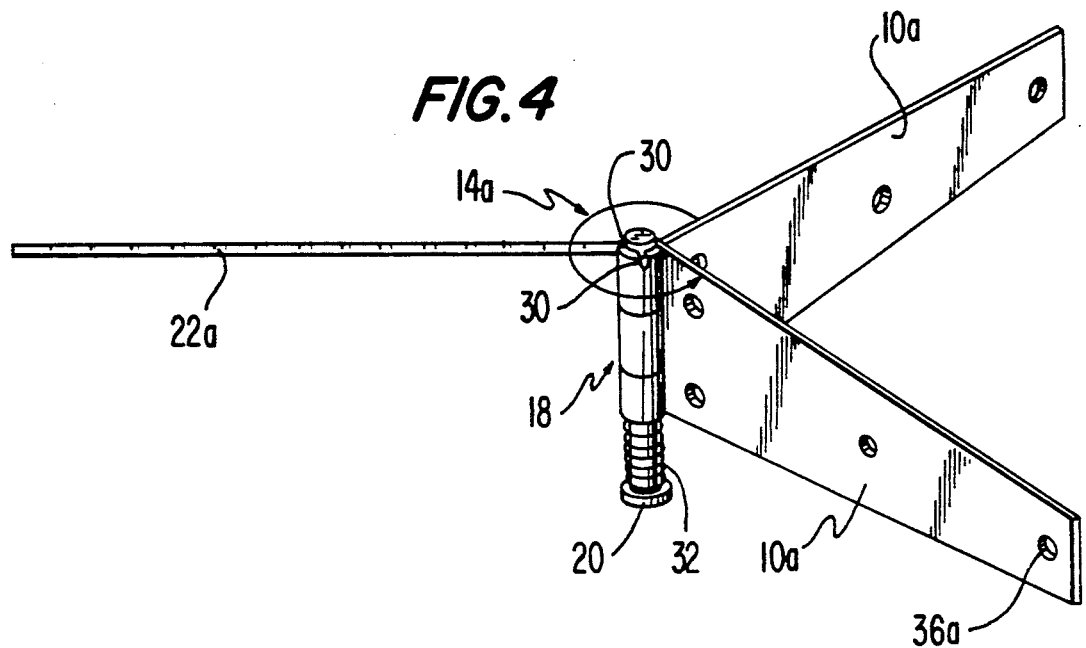
FIG. 4 is a perspective view of an embodiment of the present invention having a hinged joint defining an angle of approximately 270 degrees.
Figure 5:
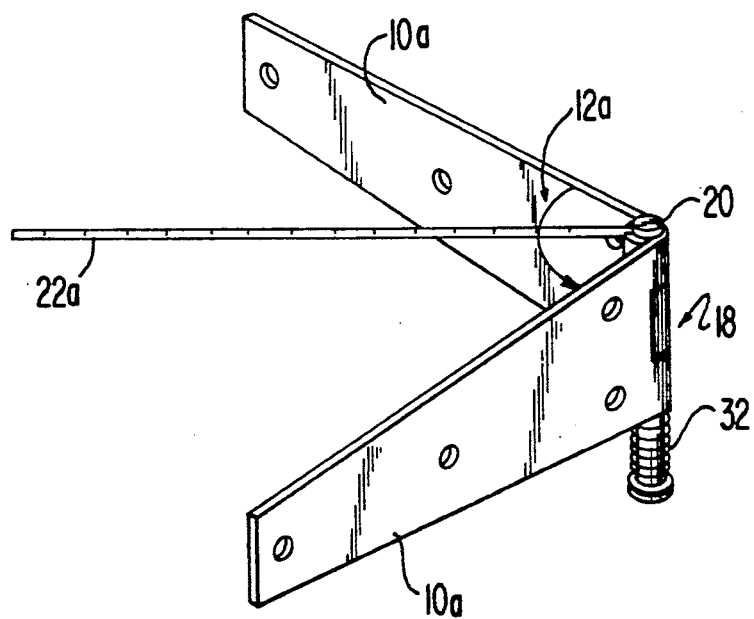
FIG. 5 is a perspective view of the embodiment of FIG. 4; however.

In accordance with the present invention, the device for aligning masonry corners also includes an adjustable, elongated rod connected at the joint. As embodied herein and shown in FIG. 2, an adjustable, elongated rod 22 is removably mounted along the fixed joint 16. Alternatively, as shown in FIGS. 4 and 5, the device includes an adjustable, elongated rod 22a which is mounted along the hinged joint 18 and extends substantially perpendicular to longitudinal axis of the pin 20. Preferably, the elongated rod 22a is integrally connected to the pin 20.

In accordance with the present invention, the device for aligning masonry corners also comprises means along the joint for fixing the elongated rod in a position bisecting in the alternative either the interior or exterior angle. As embodied herein and shown generally in FIGS. 2 and 3, means for fixing the position of the elongated rod 22 include a groove 24 formed at the fixed joint 16 for supporting the elongated rod 22. Preferably, a slot 26 is disposed within the groove 24 for receiving a projection 28 depending from the elongated rod 20, and thereby retaining the elongated rod 20 within the groove 24.

As embodied herein and shown in FIGS. 4 and 5, means for fixing the position of the elongated 22a include a pair of notches 30 disposed along the joint for engaging the elongated rod 20a. One of the notches 30 enables the elongated rod 20a to bisect interior angle 12a, while the elongated rod 20a bisects exterior angle 14a when the rod 22a is engaged with the remaining notch 30. Preferably, a spring 32 disposed along the pin 20 holds the rod 22a into engagement within notches 30.

In accordance with the present invention, the elongated rod 22, 22a includes a scale for precisely determining distances from the joint 16, 18 along the rod 22, 22a. Accordingly, a plumb line 34 may be slidably secured to the elongated rod 22, 22a and positioned a preferred distance from the joint 16, 18. The plumb line 34 preferably includes means, such as tape or a weight, disposed at its free end for affixing the plumb line 34 a predetermined distance from a base of the wall, so that the plumb line 34 extends tautly in a vertical direction from the elongated rod 22, 22a.

The operation of the invention will now be discussed in further detail. In the embodiment shown in FIGS. 1–3, members 10 are affixed to a corner of a wall 1 with nails, screws, or nuts and bolts through holes 36, 36a in the members 10. Members 10 may be mounted on an outside corner, as shown in FIG. 1, in which case the elongated rod 22 bisects the exterior angle 14. Members 10 also may be mounted on an inside corner, in which case the elongated rod 22 bisects the interior angle 12.

The device illustrated in FIGS. 4 and 5 is similarly capable of being mounted on inside and outside corners. Members 10a are pivoted about the hinged joint 18 so that the members 10a are positioned either 90 or 270 degrees relative to one another. When the members 10A are pivoted to a selected position, the pin 20 and the elongated rod 22a are lifted and rotated into engagement with the appropriate notch 30 to bisect the selected angle of the members 10a.

Accordingly, when the device shown in FIGS. 1-5 is affixed to either an inside or outside corner, with the rod assembly bisecting the appropriate angle, the plumb line 34 is extended from the elongated rod 22, 22a. The plumb line 34 is positioned a desired distance from the joint 16, 18 along the elongated rod 22, depending on the type of masonry used. The masonry units 12 are then built vertically upwards at the corner along the plumb line 34.

As may be readily seen by those skilled in the art, other methods for affixing the present invention to a corner on a wall may be used. In addition, other means for attaching a plumb line 34 to the elongated rod 22, 22a may be used, such as hooks placed underneath the rod to which the plumb line may be attached. Further, the spring 32 is not necessary, for example, if the weight of the pin 20 and elongated rod 25 is sufficient to firmly seat the assembly in the notches 30 disposed along the hinged joint 18.

Further, the device of the present invention may be formed of plastic, metal, wood or any other suitable material. In addition, the members 10, 10a may be formed in any size and shape.

Accordingly, additional advantages and modifications will readily occur to those skilled in the art. The invention in its broader aspects is therefore not limited to the specific details, representative apparatus, and illustrative examples shown and described. Thus, departures may be made from such details without departing from the spirit or scope of the invention.

What is claimed:

1. A device adapted to be mounted on a wall for aligning masonry corners comprising:
   a pair of members connected at a joint, said members defining an interior angle of approximately 90 degrees and a corresponding exterior angle of approximately 270 degrees;
   an adjustable, elongated rod mounted at said joint;
   means along said joint for fixing said elongated rod in a position bisecting in the alternative either the interior or exterior angle; and a plumb line secured to said elongated rod a selected distance from said joint.

2. The device recited in claim 1, wherein said pair of members are pivotally connected to one another at said joint.

3. The device recited in claim 1, wherein said pair of members are rigidly connected at said joint.

4. The device recited in claim 2, wherein said joint includes a pin having a longitudinal axis, whereby said pin defines a hinge pivotally connecting said members.

5. The device recited in claim 4, wherein said elongated rod is integrally connected to said pin, said elongated rod extending substantially perpendicular to a longitudinal axis of said pin.

6. The device recited in claim 5, wherein said fixing means includes notches disposed along said joint for engaging said rod.

7. The device recited in claim 3, wherein said members define a groove at said joint and said elongated rod includes means for retaining said elongated rod within said groove.

8. The device recited in claim 3, wherein said elongated rod is detachably connected to said joint.

9. The device recited in claim 1, wherein said plumb line includes means disposed at a free end thereof for affixing said plumb line a predetermined distance from a base of the wall, so that said plumb line extends tautly in a vertical direction from said elongated rod.

10. A device adapted to be mounted on a wall for aligning masonry corners comprising:
   a pair of members pivotally connected at a hinged joint, said hinged joint including a pin interconnecting said members and enabling said members to assume angles of approximately 90 degrees and approximately 270 degrees relative to one another;
   an adjustable, elongated rod mounted along said hinged joint and extending substantially perpendicular to a longitudinal axis of said pin;
   said hinged joint including means for fixing the elongated rod in a position bisecting in the alternative either the 90 degree or the 270 degree angle assumed by the hinged members; and
   a plumb line secured to said elongated rod a selected distance from the hinged joint.

11. The device recited in claim 10, wherein said fixing means includes notches disposed along said joint for engaging said rod.

12. A device adapted to be mounted on a wall for aligning masonry corners comprising:
   a pair of members integrally connected to one another at a fixed joint, said members defining an interior angle of approximately 90 degrees and a corresponding exterior angle of approximately 270 degrees;
   an adjustable, elongated rod mounted along said joint;
   means along said joint for fixing said elongated rod in a position bisecting in the alternative either the interior or exterior angle; and
   a plumb line secured to said elongated rod a selected distance from said joint.

13. The device recited in claim 12, wherein said members define a groove at said joint and said elongated rod includes means for retaining said elongated rod within said groove.

14. The device recited in claim 12, wherein said elongated rod is detachably connected to said joint.

* * * * *